US012680585B2

(12) United States Patent
Scopesi et al.

(10) Patent No.: US 12,680,585 B2
(45) Date of Patent: Jul. 14, 2026

(54) WET BRAKE SYSTEM AND METHOD FOR A VEHICLE

(71) Applicant: DANA ITALIA S.R.L., Arco (IT)

(72) Inventors: Marco Scopesi, Isera (IT); Andrea Bortoli, Trento (IT)

(73) Assignee: DANA ITALIA S.R.L., Arco (IT)

( * ) Notice: Subject to any disclaimer, the term of this patent is extended or adjusted under 35 U.S.C. 154(b) by 639 days.

(21) Appl. No.: 17/960,054

(22) Filed: Oct. 4, 2022

(65) Prior Publication Data

US 2024/0110606 A1     Apr. 4, 2024

(51) Int. Cl.
 *F16D 65/853*     (2006.01)
 *F16D 55/36*      (2006.01)
 *F16D 55/00*      (2006.01)

(52) U.S. Cl.
 CPC ........... *F16D 65/853* (2013.01); *F16D 55/36* (2013.01); *F16D 2055/0033* (2013.01)

(58) Field of Classification Search
 CPC .......... F16D 65/853; F16D 2055/0058; F16D 55/40; F16D 55/36; F16D 55/10; F16D 25/0638; F16D 13/648; F16D 2065/788; F16D 13/64; F16D 55/24; F16D 13/683; F16D 2055/0033
 See application file for complete search history.

(56) References Cited

U.S. PATENT DOCUMENTS

| | | | | |
|---|---|---|---|---|
| 2,837,181 A | * | 6/1958 | Kelley ................. | F16D 65/853 236/34.5 |
| 2,971,612 A | * | 2/1961 | Graber ................. | F16D 65/853 188/71.6 |
| 4,113,067 A | * | 9/1978 | Coons .................. | F16D 65/853 188/71.6 |
| 5,197,574 A | * | 3/1993 | Al-Deen .............. | F16D 65/853 188/71.6 |
| 6,189,669 B1 | * | 2/2001 | Kremer ................ | F16D 25/123 188/71.6 |
| 6,202,814 B1 | * | 3/2001 | Braford, Jr. .......... | F16D 65/853 188/71.6 |

(Continued)

FOREIGN PATENT DOCUMENTS

| | | | | | |
|---|---|---|---|---|---|
| CN | 103080589 B | * | 4/2016 | ............. | F16D 69/00 |
| DE | 10300614 A1 | | 7/2004 | | |

(Continued)

*Primary Examiner* — Robert A. Siconolfi
*Assistant Examiner* — Mahbubur Rashid
(74) *Attorney, Agent, or Firm* — McCoy Russell LLP

(57) ABSTRACT

Various systems and methods are provided for wet brake systems for vehicles. In one embodiment, a wet brake system for a vehicle includes a drive shaft, a housing including a brake compartment and a reservoir axially offset from the brake compartment along the drive shaft, a brake plate assembly including an end plate arranged within the brake compartment, a lower channel formed between the end plate and the housing and arranged at a drain end of the housing, and an upper channel formed between the end plate and the housing, opposite to the lower channel across the drive shaft. Coolant/lubricant within the housing, such as oil, may flow out of the brake compartment during conditions in which the drive shaft is rotated, and may flow into the brake compartment during conditions in which the drive shaft does not rotate or is relatively stationary.

20 Claims, 11 Drawing Sheets

(56)                    References Cited

U.S. PATENT DOCUMENTS

| | | | | |
|---|---|---|---|---|
| 6,345,712 | B1 * | 2/2002 | Dewald ................. | F16D 65/853 |
| | | | | 188/71.6 |
| 6,378,682 | B1 * | 4/2002 | Mohan .................... | F16D 48/04 |
| | | | | 192/103 F |
| 7,055,657 | B2 * | 6/2006 | Aschauer ............... | F16D 55/36 |
| | | | | 188/71.6 |
| 8,365,885 | B2 | 2/2013 | Pinturi et al. | |
| 11,293,497 | B2 * | 4/2022 | Ebisumoto .............. | F16D 13/52 |
| 2002/0079180 | A1 * | 6/2002 | Mohan .................... | F16D 48/02 |
| | | | | 192/82 T |
| 2021/0079965 | A1 * | 3/2021 | Bortoli .................... | F16D 55/24 |

FOREIGN PATENT DOCUMENTS

| | | | | | |
|---|---|---|---|---|---|
| DE | 69823451 | T2 | | 4/2005 | |
| DE | 60106120 | T2 | * | 10/2005 | ............ F16D 55/40 |
| DE | 102006031787 | A1 | * | 4/2007 | ............ F16D 65/78 |
| EP | 2469119 | A1 | | 6/2012 | |
| EP | 2567848 | B1 | * | 12/2014 | .......... B60K 17/046 |
| EP | 3792517 | A1 | * | 3/2021 | ............ F16D 65/853 |
| JP | S61103040 | A | * | 5/1986 | |
| JP | S63138246 | U | * | 9/1988 | |
| JP | 5498785 | B2 | * | 5/2014 | ............ F16D 65/853 |
| JP | 2021011359 | A | * | 2/2021 | |
| KR | 101811775 | B1 | * | 12/2017 | ............ B66C 23/84 |

* cited by examiner

WET BRAKE SYSTEM AND METHOD FOR A VEHICLE

TECHNICAL FIELD

The present disclosure relates generally to vehicle brake systems, and in particular, to wet brake systems for vehicles.

BACKGROUND AND SUMMARY

Wet brake systems for vehicles may provide smooth, progressive braking action with reduced wear. Wet brake systems often include a housing which encloses a brake compartment and a liquid sump formed by or within the brake compartment. The liquid sump may be filled or at least partially filled with a cooling and/or lubricating liquid, such as oil. Often, a plurality of friction plates coupled to a wheel hub and a plurality of separator plates coupled to the housing are alternatingly disposed within the brake compartment and are at least partially submersed in a liquid held within the liquid sump. The friction plates may be coupled to the wheel hub via a first splined connection that forces the friction plates to rotate with the wheel hub. The friction plates may have freedom of movement in an axial direction defined by the axis of rotation. The separator plates may be coupled to the housing via a second splined connection that rotationally locks the separator plates to the housing, and the separator plates may also have freedom of movement in the axial direction. The friction plates and the separator plates may be frictionally engaged with one another for braking the friction plates and the wheel hub by compressing the alternating friction plates and separator plates in the axial direction. Often, a brake piston frictionally engages the friction plates and the separator plates with one another to provide braking of the vehicle.

However, power losses may result from the rotating motion of the friction plates submersed in the liquid held within the brake compartment. These power losses typically scale linearly with the viscosity of the liquid in which the friction plates are submersed and quadratically with the rotational speed of the friction plates. Further, these power losses are usually inversely proportional to the width of the gaps formed in between the friction plates and the separator plates. In most cases, widening the gap in between the friction plates and the separator plates is not feasible as the longer stroke resulting from the increased gap width would result in a delayed response when braking. And while reducing the viscosity of the cooling or lubricating liquid could potentially reduce power losses, it often diminishes the lubrication capability which may be undesirable in many applications.

In one example, the issues described above may be addressed by a wet brake system for a vehicle including a drive shaft, a housing including a brake compartment and a reservoir axially offset from the brake compartment along the drive shaft, a brake plate assembly including an end plate arranged within the brake compartment, a lower channel formed between the end plate and the housing and arranged at a drain end of the housing, and an upper channel formed between the end plate and the housing, opposite to the lower channel across the drive shaft. In this way, coolant/lubricant within the housing, such as oil, may flow out of the brake compartment during conditions in which the drive shaft is rotated, which may reduce drag within the wet brake system and increase vehicle performance.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

DETAILED DESCRIPTION

Figure 9:
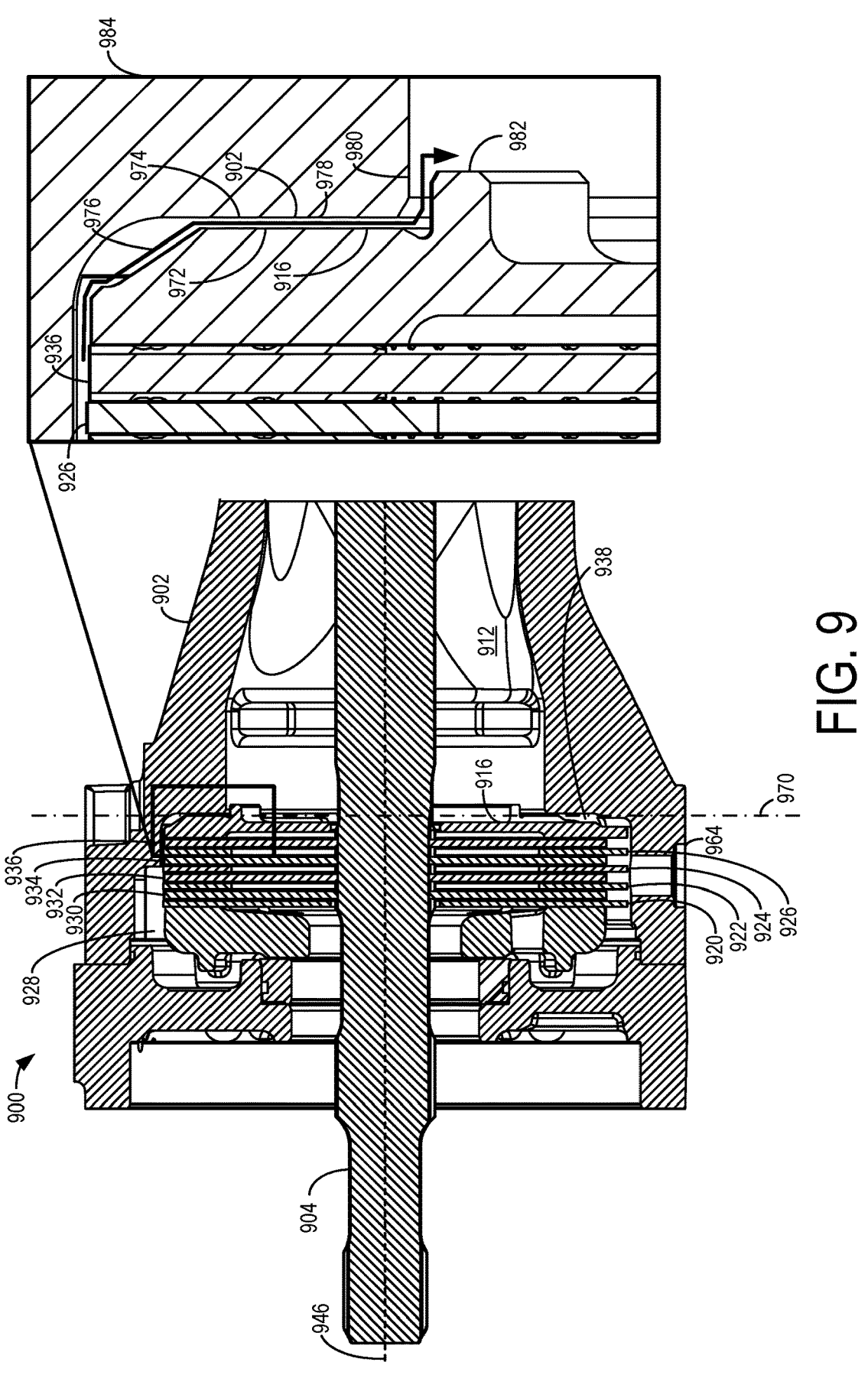
FIG. 9 shows a side sectional view of a housing of another wet brake system including a brake plate assembly.
Figure 10:
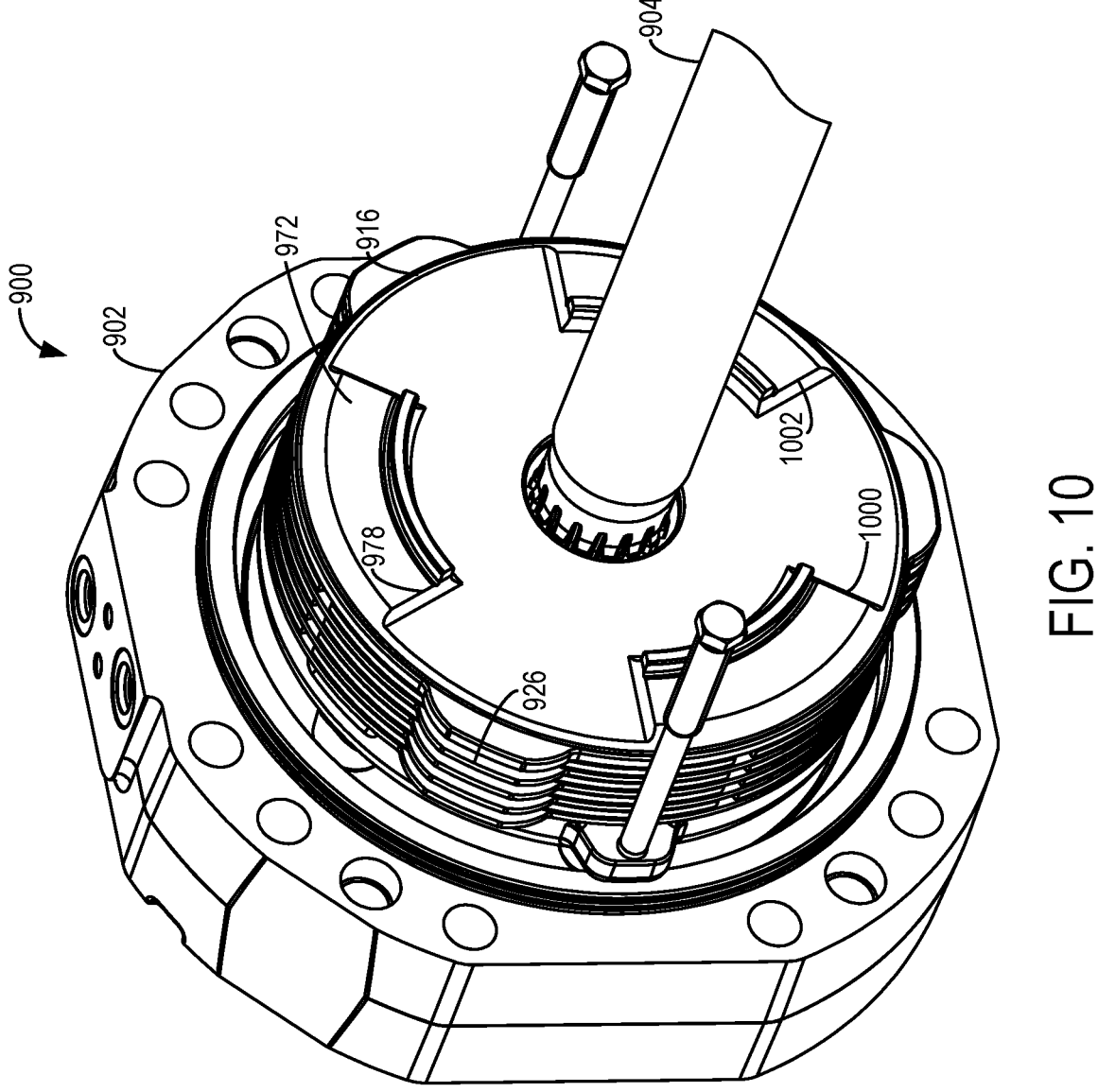
FIG. 10 shows a partial perspective sectional view of the wet brake system of FIG. 9.
Figure 11:
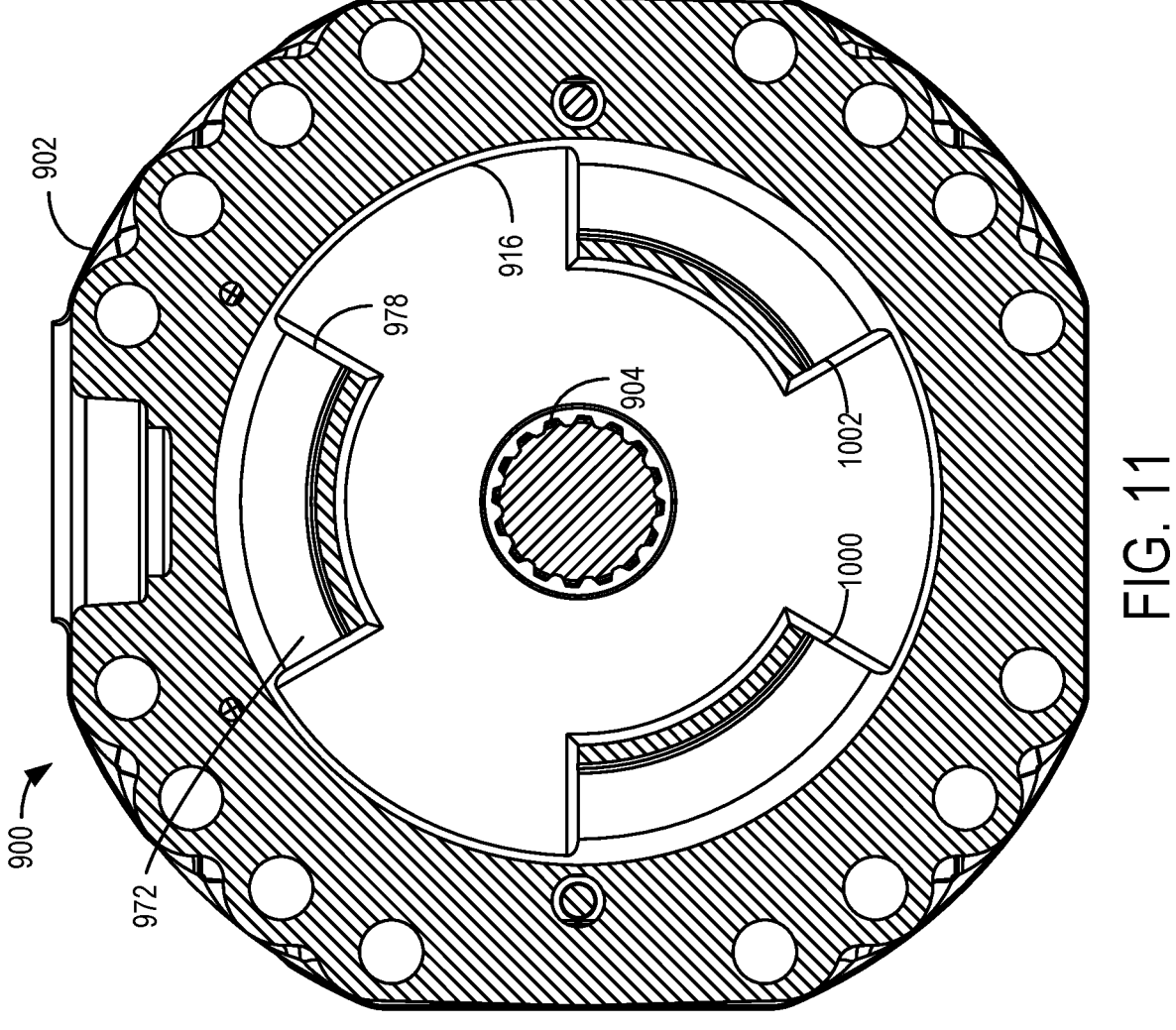
FIG. 11 shows an end sectional view of the wet brake system of FIGS. 9-10.

The following description relates to wet brake systems for a vehicle and methods of operating vehicle wet brake systems. A vehicle, such as the vehicle shown by FIG. 1, includes a wet brake system, such as the wet brake system shown by FIGS. 2 and 5. The wet brake system includes a brake plate assembly arranged within a housing, with a brake plate assembly compartment of the housing separated from a reservoir of the housing by an end plate of the brake plate assembly. A lower channel is formed between the end plate and the housing at a lower end of the housing, as shown by FIGS. 4 and 6, and an upper channel is formed between the end plate and the housing at an upper end of the housing, as shown by FIGS. 3 and 7. During conditions in which friction plates of the brake plate assembly are rotated via rotation of a drive shaft, oil may flow out of the brake plate assembly compartment via the upper channel. As a speed of the vehicle increases, a volume of oil within the brake plate assembly compartment may decrease. During conditions in which the friction plates of the brake plate assembly are stopped or rotated at a lower speed, oil from the reservoir may flow to the brake plate assembly compartment via the lower channel. In some configurations, as shown by FIGS. 9-11, the wet brake assembly may additionally include at least one side channel arranged to increase the flow of oil out of the brake plate assembly compartment.

Wet brake systems are often included within off-highway vehicles. Although such systems often provide desirable braking characteristics, viscous and churning power losses may reduce vehicle efficiency. Coolant (e.g., oil) within the wet braking systems may increase a smoothness of braking and reduce wear, but the coolant may increase energy losses. Lost power at the brakes may scale linearly relative to the oil viscosity, quadratically relative to the vehicle speed, and may be inversely proportional to the gap between separator plates and friction plates. Further, these power losses are usually inversely proportional to the width of the gaps formed in between the friction plates and the separator plates. In most cases, widening the gap in between the friction plates and the separator plates is not feasible as the longer stroke resulting from the increased gap width would increase a likelihood of a delayed response when braking. And while reducing the viscosity of the cooling or lubricating liquid could potentially reduce power losses, it typically diminishes the lubrication capability which may be undesirable in many applications. As vehicle speeds increase, in particular with regard to electric vehicles, may be desirable to reduce power losses of wet brake systems to increase vehicle performance.

Although partially submerging friction plates and separator plates in oil may provide sufficient cooling at lower vehicle speeds, energy efficiency may be reduced. For higher vehicle speeds, more energy may be dissipated by the wet brake system, which may result in an increased temperature of the friction plates and/or separator plates. According to the present disclosure, a wet brake assembly utilizes rotation of the friction plates to provide centrifugal pumping of oil within the wet brake system. At higher vehicle speeds, the rotation of the friction plates drives oil through a compartment of the brake plate assembly toward an oil reservoir to reduce a volume of oil within the brake plate assembly compartment. As a result, a smaller volume of oil is maintained within the brake plate assembly compartment at the higher vehicle speeds, thereby providing lubrication of the surfaces of the brake plate assembly while reducing energy losses that would otherwise result from contact of the brake plate assembly with larger volumes of oil. As the vehicle speed decreases (e.g., during a braking event), the rotation of the friction plates may slow significantly or stop, and oil may flow from the reservoir to the brake plate assembly compartment (e.g., via gravity). The increased volume of oil within the brake plate assembly compartment at lower vehicle speeds may increase cooling of the brake plate assembly, such as during a braking event. The nominal oil level may be lower than the inner diameter of the separator plates of the brake plate assembly. At an upper end of the brake plate assembly, an upper channel is provided between the brake plate assembly and the housing of the wet brake system, and at a lower end of the brake plate assembly, a lower channel is provided between the brake plate assembly and the housing. Oil may flow into the brake plate assembly compartment at lower vehicle speeds through the lower channel, and oil may flow out of the brake plate assembly compartment at higher vehicle speeds through the upper channel. In this way, lubrication of the plates of the brake plate assembly may be maintained while the volume of oil in contact with the brake plate assembly at higher vehicle speeds may be decreased, and energy losses may be reduced.

Figure 1:
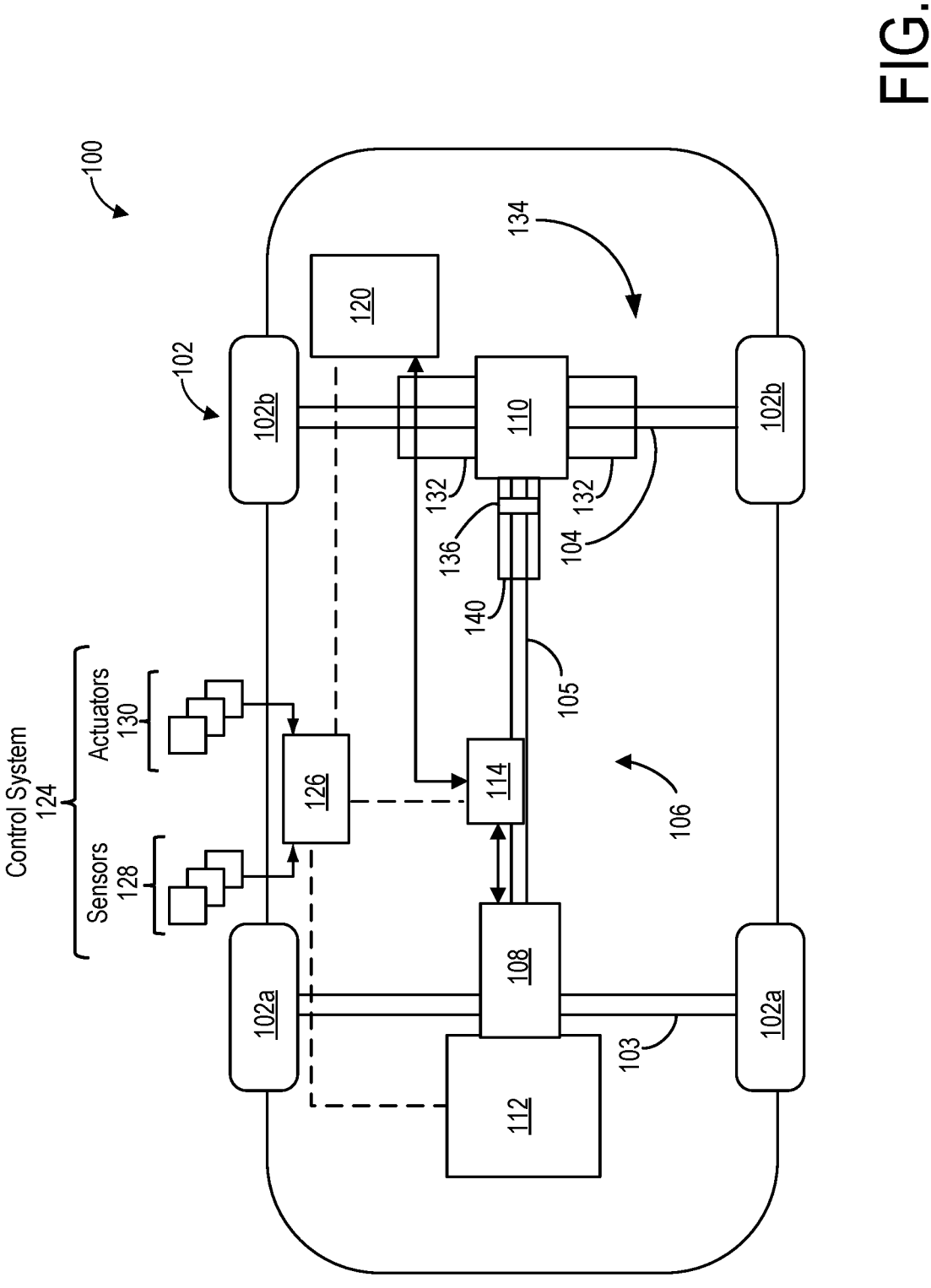
FIG. 1 schematically shows a vehicle including a wet brake system.

Referring to FIG. 1, a schematic representation of a vehicle 100 is depicted. It will be appreciated that vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1 for brevity. Vehicle 100 may be an internal combustion engine (ICE) vehicle, a hybrid electric vehicle (HEV), as shown in FIG. 1, or an all-electric vehicle (EV). Vehicle 100 includes wheels 102, e.g., front wheels 102a and rear wheels 102b, with the front wheels 102a coupled by a front axle 103 and the rear wheels 102b coupled by a rear axle 104. As shown in FIG. 1, the vehicle 100 may be configured with rear-wheel drive but other examples include vehicles with front-wheel drive, four-wheel drive or all-wheel drive.

A drive train 106 of vehicle 100 may include a transmission 108 (e.g., a gear box, gear train, etc.) configured to receive torque input from a rotating source and output torque to a drive shaft 105. In some configurations, the rotating source may be an engine 112. In other configurations, the vehicle 100 may have more than one rotating source, including the engine 112 and an electric machine 114. In yet other configurations, engine 112 may be omitted and at least one additional electric machine may be incorporated. In some examples, the electric machine 114 may be a motor/generator, with a capacity to convert electrical energy into mechanical energy and vice versa. As such, the electric machine 114 may be electrically coupled to a traction battery 120 of vehicle 100 to both draw power from the traction battery 120 and generate electrical energy to be stored at the traction battery 120.

The drive shaft 105 extends between the transmission 108 and a differential 110 and is engaged by the transmission 108 to output torque. The output torque may be moderated based on selective adjustments to gear engagement at the transmission 108 to accommodate desired vehicle operation. The differential 110 is arranged at a central region of the rear axle 104, and rotation of the drive shaft 105 drives rotation of various gears, such as side gears, pinion gears, etc., of the differential 110, which is transferred to rotation of the rear axle 104.

In this way, the transmission 108 may transmit torque output from the rotating source to the wheels 102 to enable vehicle motion. In one example, the transmission 108 may be an in-line transmission, e.g., an input/output shaft of the transmission is aligned with an output shaft of the rotating source(s), which may be configured with a planetary gear system. The planetary gear system may include various gears and components, such as a ring gear, a sun gear, planetary gears, and a carrier, and vehicle speed may be controlled based on selective engagement of the gears and components with one another.

The vehicle 100 includes a wet brake system 134 which utilizes flow of a hydraulic fluid (e.g., coolant/lubricant, such as oil) to adjust operation a brake plate assembly 136. The brake plate assembly 136 is housed within a housing 140. The housing 140 encloses a portion of drive shaft 105 of the vehicle 100. The axle 104 may additionally be enclosed within an axle housing 132. During conditions in which braking of the vehicle 100 is desired, the plates of the brake plate assembly 136 may be pressed together via an actuator (e.g., a brake piston) to reduce a rotation of the axle 104, as described further below.

Vehicle 100 may further include a control system 124, including a controller 126, sensors 128, and actuators 130. Controller 126 may be a microcomputer, including elements such as a microprocessor unit, input/output ports, an electronic storage medium for executable programs and calibration values, e.g., a read-only memory chip, random access memory, keep alive memory, and a data bus. In one example, controller 126 may be a powertrain control module (PCM).

Controller 126 may receive various signals from sensors 128 coupled to various regions of vehicle 100. For example, the sensors 128 may include position sensors coupled to the transmission 108, the differential 110, and/or the wet brake system 134, engine sensors for monitoring engine speed, temperature, air mass flow, etc., sensors coupled to the traction battery 120 for measuring a battery state of charge and temperature, and sensors coupled to the electric machine 114 for monitoring a status of the electric machine 114. Upon receiving the signals from the various sensors 128 of FIG. 1, controller 126 processes the received signals, and employs various actuators 130 of vehicle 100 to adjust engine and drive train operations based on the received signals as well as instructions stored at a memory of controller 126.

Figure 2:
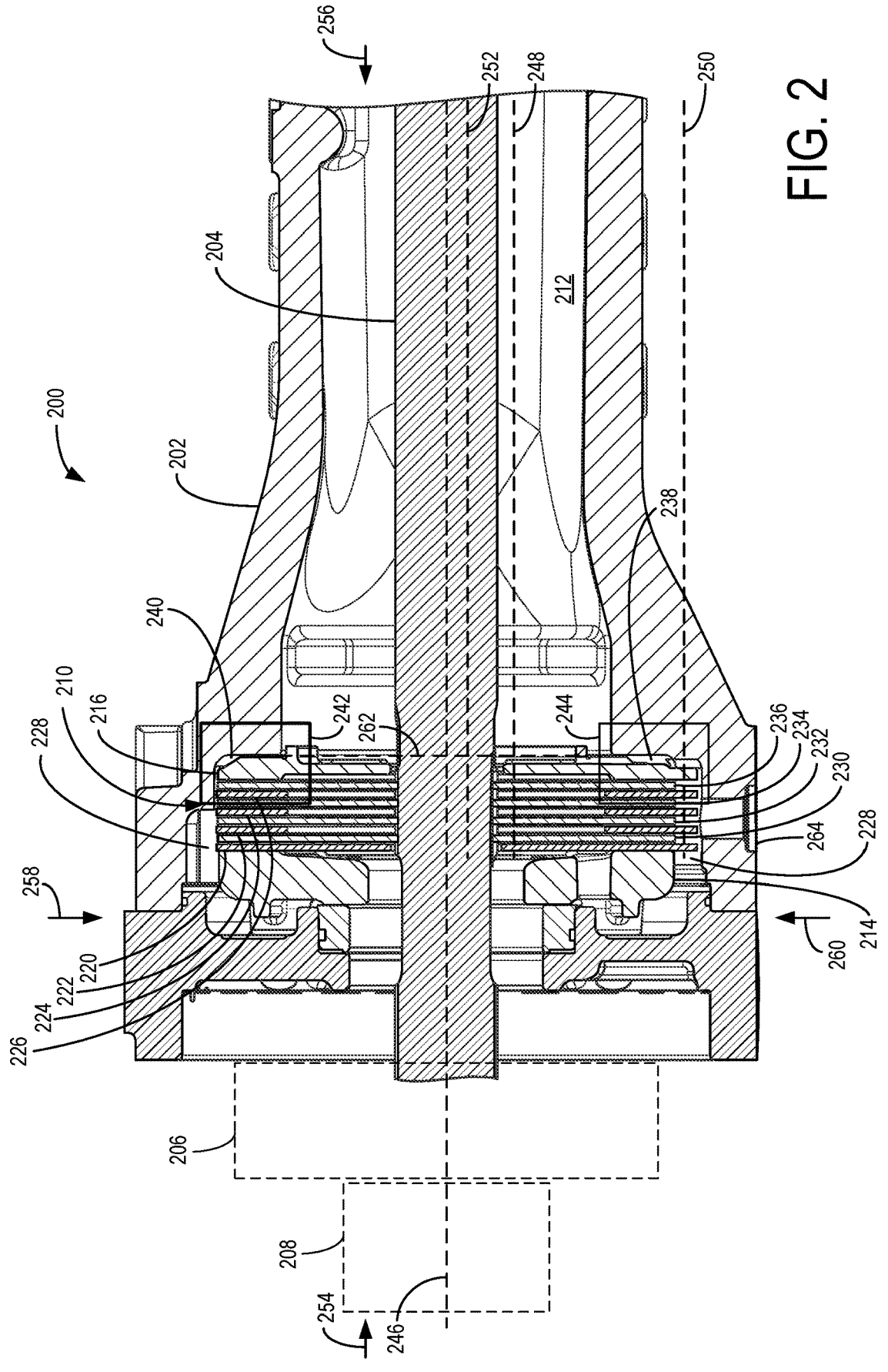
FIG. 2 shows a side sectional view of a housing of a wet brake system including a brake plate assembly.
Figure 3:
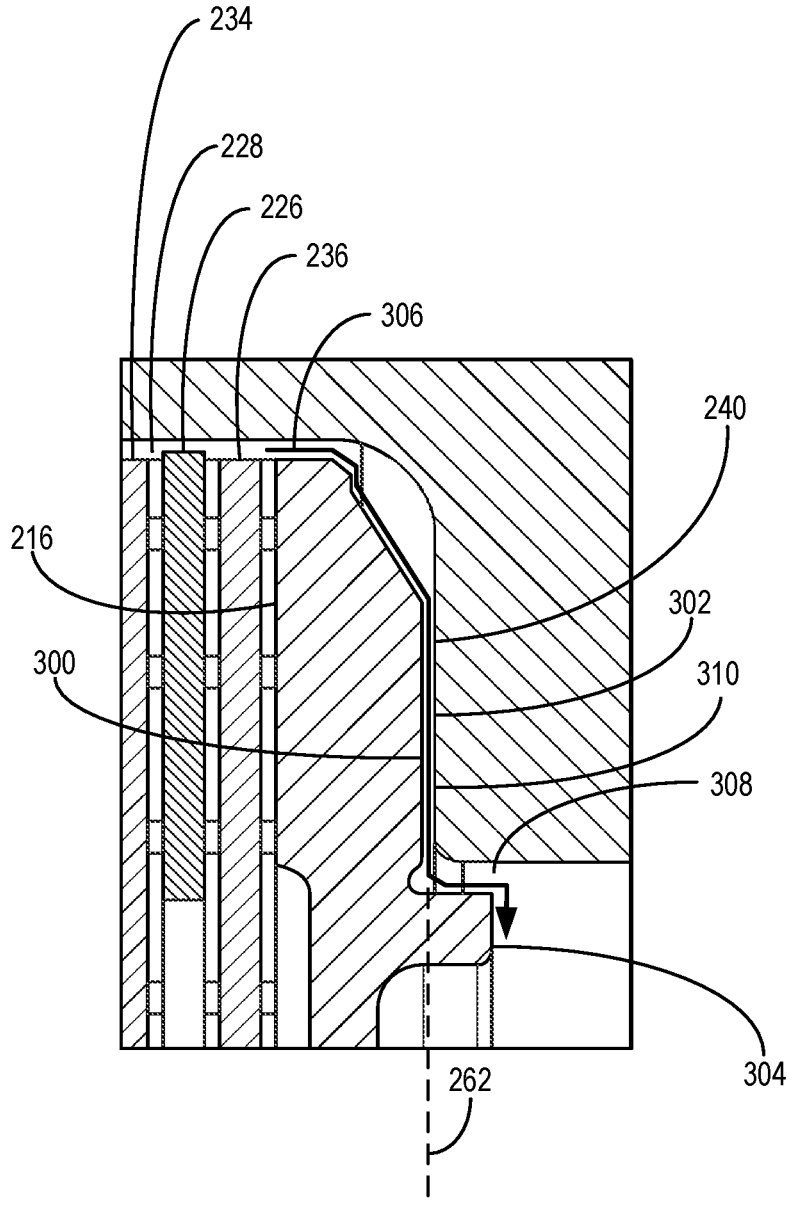
FIG. 3 shows an enlarged sectional view of a portion of the wet brake system of FIG. 2.
Figure 4:
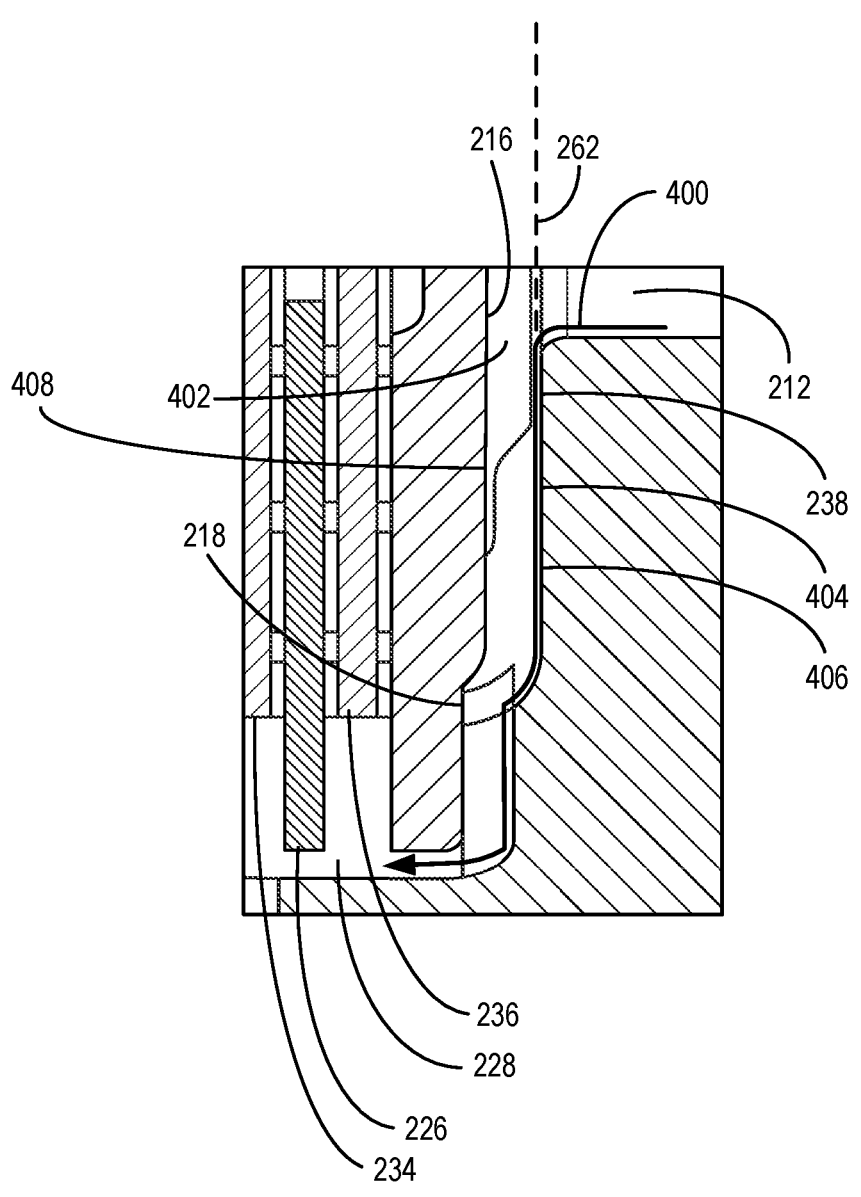
FIG. 4 shows an enlarged sectional view of another portion of the wet brake system of FIGS. 2-3.
Figure 5:
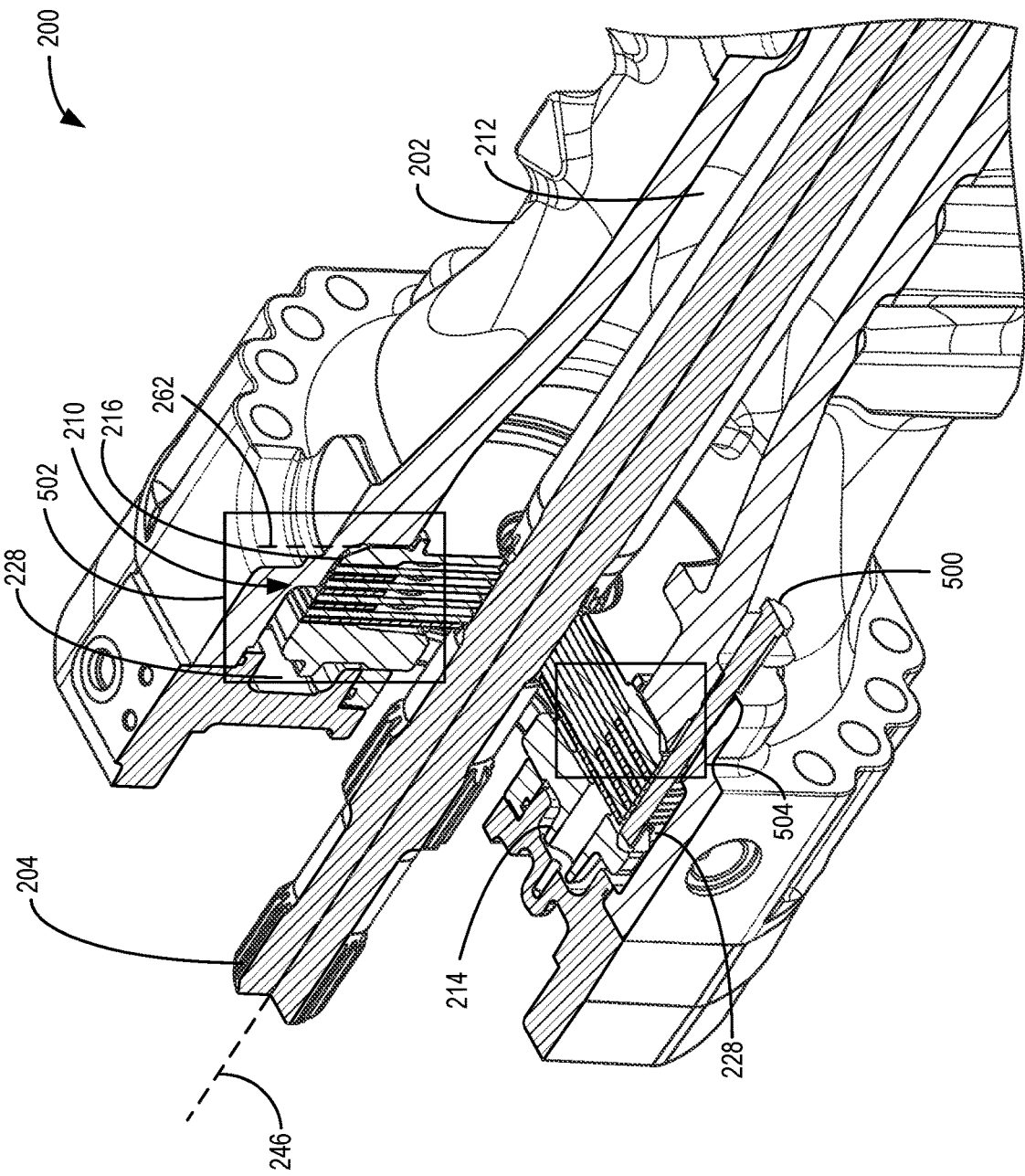
FIG. 5 shows a perspective sectional view of the wet brake system of FIGS. 2-4.
Figure 6:
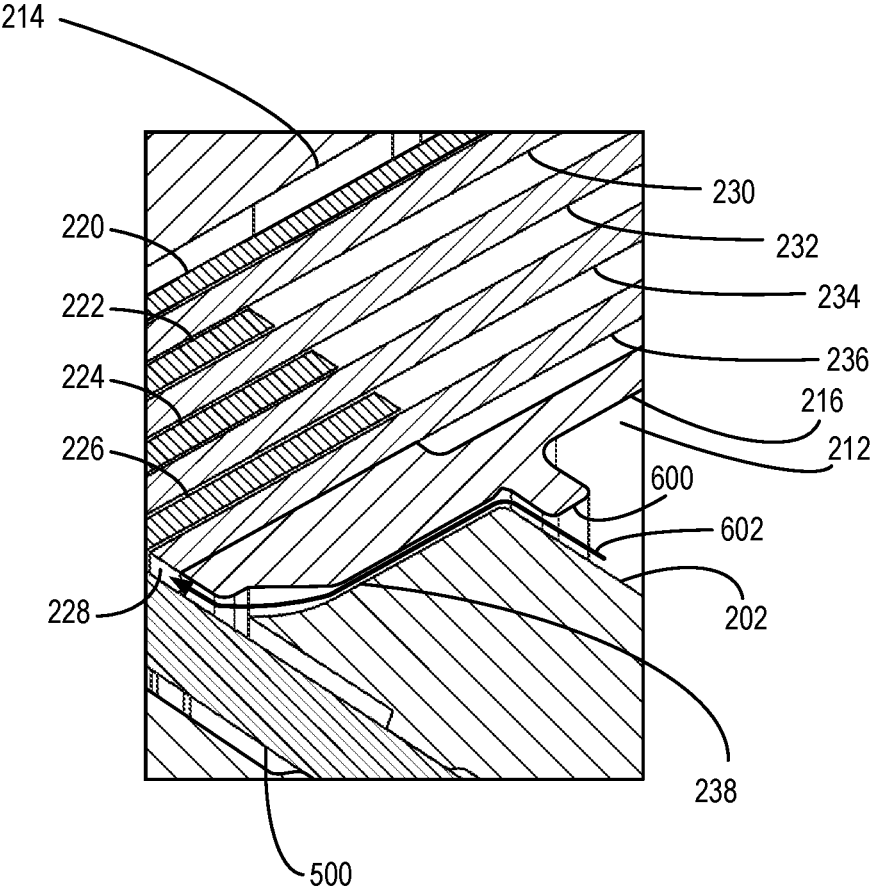
FIG. 6 shows an enlarged perspective sectional view of another portion of the wet brake system of FIGS. 2-5.
Figure 7:
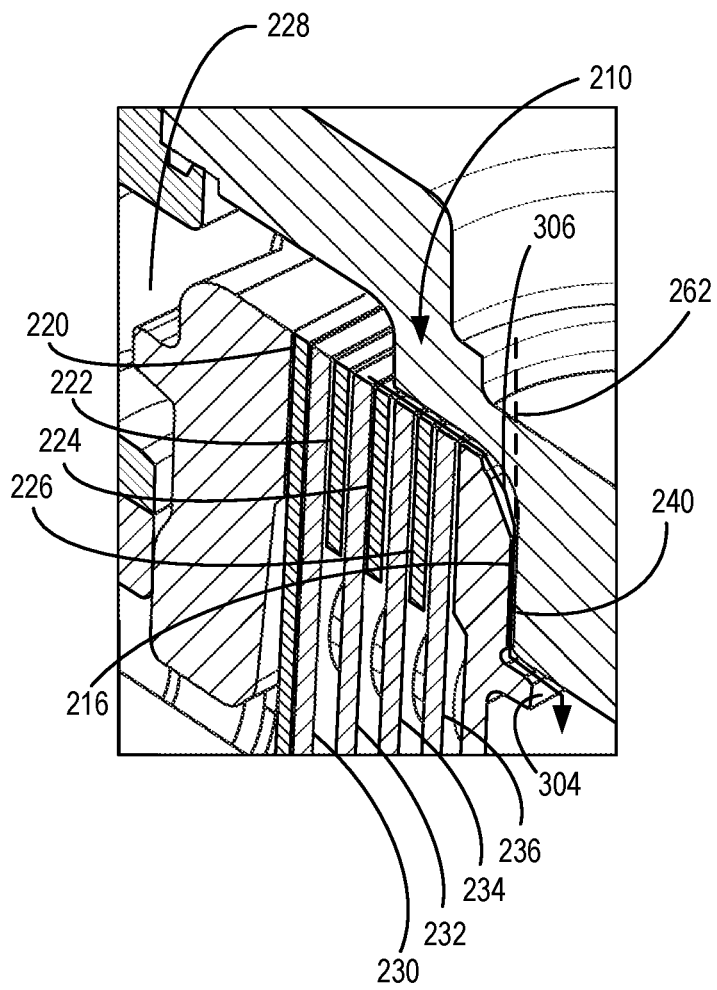
FIG. 7 shows an enlarged perspective sectional view of another portion of the wet brake system of FIGS. 2-6.

Referring to collectively to FIGS. 2-7, different views of a wet brake system 200 are shown. In particular, FIG. 2 shows a side sectional view of the wet brake system 200, FIG. 3 shows an enlarged side sectional view of an upper portion of the wet brake system 200 (indicated by inset 242 in FIG. 2), FIG. 4 shows an enlarged side sectional view of a lower portion of the wet brake system 200 (indicated by inset 244 in FIG. 2), FIG. 5 shows a perspective sectional view of the wet brake system 200, FIG. 6 shows an enlarged perspective sectional view of a portion of the wet brake system 200 (indicated by inset 504 in FIG. 5), and FIG. 7 shows an enlarged perspective sectional view of another portion of the wet brake system 200 (indicated by inset 504 in FIG. 5). The wet brake system 200 may be similar to, or the same as, the wet brake system 134 shown by FIG. 1 and described above. The housing 202 may be similar to, or the same as, the housing 140 shown by FIG. 1 and described above.

The housing 202 comprises a reservoir 212 and an axially shorter brake compartment 228. The brake compartment 228 has, by way of example, a larger diameter than the reservoir 212 in the vertical direction (e.g., the radial direction relative to drive shaft 204). The brake compartment 228 encloses a brake plate assembly 210 including a plurality of friction plates and a plurality of separator plates. The friction plates are coupled to the drive shaft 204 and may rotate with the drive shaft 204 as the drive shaft 204 rotates. The separator plates are axially displaceable, but rotationally stationary and connected to the housing 202. The brake compartment 228 additionally houses a brake piston 214 that is axially displaceable to apply force to the brake plate assembly 210 to compress the plates (e.g., the friction plates and the separator plates) of the brake plate assembly 210 against each other.

The plurality of friction plates may include a first friction plate 230, a second friction plate 232, a third friction plate 234, and a fourth friction plate 236. The plurality of separator plates may include a first separator plate 220, a second separator plate 222, a third separator plate 224, a fourth separator plate 226, and an end plate 216. The end plate 216 is the last plate in the plurality of plates of the brake plate assembly 210 (e.g., with each other plate of the brake plate assembly 210 arranged at a first side of the end plate 216 and with no plates of the brake plate assembly 210 arranged at an opposing, second side of the end plate 216, where the first side may face a differential coupled to the drive shaft 204 and the second side may face a wheel hub coupled to the drive shaft 204). The friction plates and the separator plates may be in an alternating arrangement, with the first separator plate 220 directly adjacent to the first friction plate 230, the second separator plate 222 directly adjacent to each of the first friction plate 230 and the second friction plate 232 (e.g., between the first friction plate 230 and the second friction plate 232), etc.

Housing 202 is shown enclosing a portion of a drive shaft 204. The drive shaft 204 may be similar to, or the same as, the drive shaft 105 shown by FIG. 1 and described above. The drive shaft 204 may be couplable or coupled to an engine of the vehicle (e.g., engine 112 shown by FIG. 1 and described above) and/or to a driven wheel of the vehicle. The drive shaft 204 is concentrically arranged within the housing 202. At a first axial end 254, the drive shaft 204 may be connected to a differential 208 (shown schematically in FIG. 2). The differential 208 may be similar to, or the same as, the differential 110 described above with reference to FIG. 1. The housing 202 of the wet brake system 200 may additionally be coupled to an axle housing 206 at the first axial end 254, where the axle housing 206 may be similar to, or the same as, the axle housing 132 described above with reference to FIG. 1. At a second axial end 256 opposite to the first axial end 254, the drive shaft 204 may be coupled to a wheel hub and thus to a vehicle wheel (e.g., via a universal joint).

The brake compartment 228 and the reservoir 212 may be axially adjacent or directly axially adjacent to one another. The brake compartment 228 and the reservoir 212 may be separated from one another by end plate 216.

Each friction plates may rotate around the rotational axis 246 of the drive shaft 204. The coupling between the at least one separator plate and the housing 202 may be configured to allow the at least one separator plate to move in the axial direction (e.g., parallel with the rotational axis 246 of the drive shaft 204) and to provide a rotationally-locked connection between the at least one separator plate and the housing 202 with respect to the rotational axis 246 (e.g., the separator plates may be locked by the housing 202 such that the separator plates do not rotate relative to the housing 202). Additionally, each of the friction plates may be movable in the axial direction, parallel with the rotational axis 246. The alternating friction plates and separator plates may be compressed together (e.g., compressed against each other) in the axial direction in order to provide braking of the vehicle.

When axially compressing the brake plate assembly 210 via the brake piston 214, the rotating friction plates are forced into contact with the nonrotating separator plates and are thus braked. As a result, the rotation of the drive shaft 204 is braked, along with one or more wheels driven by the drive shaft 204.

An upper channel 240 (which may be referred to herein as a coolant/lubricant output channel and/or an oil output channel) may be positioned vertically above a coolant/lubricant (e.g., oil) filling level of the reservoir 212 and the brake compartment 228 (e.g., above the level of coolant/lubricant within the reservoir 212 and the brake compartment 228 during conditions in which the friction plates of the brake plate assembly 210 are not rotating). As one example, the upper channel 240 may be positioned vertically above the drive shaft 204. The vertical direction, as described herein, refers to the direction indicated by axis 262, where axis 262 is arranged orthogonal to the rotational axis 246 of the drive shaft 204 and extends between the drain end 260 and the upper end 258 of the housing 202 (e.g., in a direction parallel with gravity during conditions in which the housing 202 is fixed within the vehicle). The drain end 260 of the housing 202 is an end arranged vertically below the upper end 258 and may include a drain plug 264. Drain plug 264 may be removed, for example, during maintenance of the housing 202 in order to drain coolant/lubricant (e.g., oil) from the housing 202 via gravity. The coolant/lubricant may be referred to herein as oil, although oil is one non-limiting example of coolant/lubricant that may be used.

The upper channel 240 and a lower channel 238 may each be elongated and approximately straight (e.g., without curvature). The lower channel 238 may be referred to herein as a coolant/lubricant intake channel and/or an oil intake channel. Each of the upper channel 240 and the lower channel 238 may extend toward the drive shaft 204, with an inlet 402 (e.g., an opening, shown by FIG. 4) of the lower channel 238 arranged to receive oil from the reservoir 212 and with an outlet 308 (e.g., an opening, shown by FIG. 3) of the upper channel 240 arranged to return oil to the reservoir 212. The outlet 308 may be formed between an extension 304 of the end plate 216 and the housing 202. The inlet 402 and the outlet 308 may be arranged equidistant from the drive shaft 204, in some examples. A length between the drive shaft 204 and the inlet 402 of the lower channel 238 in the radial direction of the drive shaft 204 may be less than a length between the drive shaft 204 and each other portion of the lower channel 238, in some examples, and a length between the drive shaft 204 and the outlet 308 of the upper channel 240 in the radial direction of the drive shaft 204 may be less than a length between the drive shaft 204 and each other portion of the upper channel 240, in some examples.

The housing 202 includes an upper shoulder 310 (shown by FIG. 3) and a lower shoulder 404. The upper shoulder 310 and the lower shoulder 404 are each portions of the housing 202 extending in the radial direction of the drive shaft 204, with the upper shoulder 310 extending toward the drive shaft 204 from the upper end 258 of the housing 202 and with the lower shoulder 404 extending toward the drive shaft 204 from the drain end 260 of the housing 202. The upper shoulder 310 and the lower shoulder 404 are arranged opposite to each other across the drive shaft 204 (e.g., at opposite ends of the housing 202, across the rotational axis 246).

The upper channel 240 and the lower channel 238 may each be defined at least in part by an upper end surface 300 (shown by FIG. 3) of the end plate 216, with the upper channel 240 being further defined at least in part by an end surface 302 (shown by FIG. 3) of the upper shoulder 310 and with the lower channel 238 being further defined at least in part by an end surface 406 (shown by FIG. 4) of the lower shoulder 404. Although the upper shoulder 310 and the lower shoulder 404 are described separately herein, in some examples the upper shoulder 310 and the lower shoulder 404 may be portions of a single, annular shoulder encircling the drive shaft 204. Similarly, the upper end surface 300 and lower end surface 408 of the end plate 216 may be portions (e.g., upper and lower portions, respectively, in the vertical direction) of a single, continuous end surface of the end plate 216.

In the configuration described herein, the upper channel 240 forms a gap (e.g., clearance) between the upper end surface 300 of the end plate 216 and the end surface 302 of the upper shoulder 310, and the lower channel 238 forms a gap between the lower end surface 408 of the end plate 216 and the end surface 406 of the lower shoulder 404. The radial dimension or extension of the upper channel 240 may exceed the axial dimension or extension of the upper channel 240 by a factor of three or more in some examples, and the radial dimension or extension of the lower channel 238 may exceed the axial dimension or extension of the lower channel 238 by a factor of three or more in some examples. The radial dimension of the lower channel 238 and the radial dimension of the upper channel 240 may each provide for the fluidic connection of the reservoir 212 and the brake compartment 228, with the upper channel 240 configured to flow oil from the brake compartment 228 to the reservoir 212 and with the lower channel 238 configured to flow oil from the reservoir 212 to the brake compartment 228. The axial dimension of the upper channel 240 may define a width of the upper channel 240, and the axial dimension of the lower channel 238 may define a width of the lower channel 238. In some examples, the upper channel 240 and/or the lower channel 238 may have continuous or varying dimensions (e.g. a continuous or varying axial width or diameter).

The end surfaces of the end plate (e.g., upper end surface 300 and lower end surface 408) and the end surfaces of the shoulders (e.g., end surface 302 of upper shoulder 310 and end surface 406 of lower shoulder 404) may generally be smooth and/or planar.

Each of the upper channel 240 and the lower channel 238 may not be fully enclosed by only one of the housing 202 or the end plate 216 of the brake plate assembly 210. For example, each of the upper channel 240 and the lower channel 238 may not extend in a tunnel like manner through only one of said members. This simplifies production because no respective tunnel structure has to be provided, e.g., by drilling and/or complex casting when producing a respective member. Rather, the upper channel 240 and the lower channel 238, and in particular sidewalls thereof, may be formed or bounded by both of the housing 202 and the end plate 216.

The upper shoulder 310 and the lower shoulder 404 may each be at least partially sealingly engaged with the end plate 216 such that the upper channel 240 and the lower channel 238 form the only fluidic connections between the reservoir 212 and the brake compartment 228. Accordingly, apart from the upper channel 240 and lower channel 238 described herein, the brake compartment 228 and the reservoir 212 may at least partially be sealingly separated from one another. A sealing, as used herein, refers to a liquid sealing, whereas a partial sealing may, for example, significantly inhibit a free liquid flow but may not fully suppress a fluidic communication.

The upper end surface 300 and lower end surface 408 of the end plate 216, the end surface 302 of the upper shoulder 310, and the end surface 406 of the lower shoulder 404 may extend parallel to one another and in particular at a common non-zero angle relative to the rotational axis 246. For example, the upper end surface 300 and lower end surface 408 of the end plate 216, the end surface 302 of the upper shoulder 310, and the end surface 406 of the lower shoulder 404 may each extend orthogonally to said rotational axis.

During conditions in which the friction plates are driven to rotate by rotation of the drive shaft 204, suction within the brake compartment 228 may occur as a result of centrifugal pumping provided by the rotation of the friction plates. A continuous flow of oil may thus be generated from the reservoir 212 to the brake compartment 228 and through the brake plate assembly 210, and the oil may return to the reservoir 212 from the brake compartment 228 via the upper channel 240. Oil flowing from the brake compartment 228 to the reservoir 212 via the upper channel 240 may flow in a radial direction of the drive shaft 204, as indicated by example flow path 306 shown by FIG. 3 (e.g., vertically downward, toward the drive shaft 204). The oil may collect within the reservoir 212 and may subsequently return to the brake compartment 228 via the lower channel 238 (e.g., along a flow path through the lower channel 238, such as the flow path 400 shown by FIG. 4). In some examples the oil may flow from the reservoir 212 to the brake compartment 228 along a flow path that has at least a partially axial direction component, such as the flow path 602 around seat 600 of the end plate 216 as shown by FIG. 6.

In some examples, a flow rate of oil from the reservoir 212 through the lower channel 238 to the brake compartment 228 may be lower than a flow rate of oil from the brake compartment 228 through the upper channel 240 to the reservoir 212. For example, a width of the lower channel 238 in the axial direction (e.g., the direction parallel to the rotational axis 246 of the friction plates) may be smaller than a width of the upper channel 240 in the axial direction. The reduced width of the lower channel 238 may result in restriction of the flow of oil through the lower channel 238 relative to the flow of oil through the upper channel 240. In this configuration, as the friction plates rotate and apply centrifugal pumping to the oil within the brake compartment 228, the flow rate of oil out of the brake compartment 228 to the reservoir 212 via the upper channel 240 may be larger than the flow rate of oil into the brake compartment 228 from the reservoir 212 via the lower channel 238.

The upper channel 240 and the lower channel 238 may each be positioned at an axial distance from the end plate 216 and may be aligned with each other along a same plane. Each of the upper channel 240 and the lower channel 238 may not axially overlap with the brake plate assembly 210. In the example shown, each of the upper channel 240 and the lower channel 238 extends in a radial direction relative to the rotational axis 246. In other examples, one or both of the upper channel 240 and the lower channel 238 may extend approximately radially relative to the rotational axis 246 but at a slight angle relative to the radial direction (e.g., between 86-90 degrees relative to the rotational axis 246).

Although the upper channel 240 and the lower channel 238 are described herein as separate channels, in some embodiments the upper channel 240 and the lower channel 238 may be joined together as a single, annular channel adjacent to (and defined at least in part by) the end plate 216. For example, the single annual channel may extend along an entire inner perimeter of the housing 202 at the location adjacent to the end plate 216 indicated by axis 262, with the lower portion of the annual channel configured to receive oil from the reservoir 212 and with the upper portion of the annular channel configured to return oil to the reservoir 212 based on the rotation of the friction plates as described with reference to the example shown. In particular, the upper portion of the annular channel may be arranged vertically above the rotational axis 246 of the drive shaft 204, and the lower portion of the annular channel may be arranged vertically below the rotational axis 246. In this configuration, although the annular channel is a single channel, oil may flow from the reservoir to the lower portion of the annular channel via gravity while oil may not flow from the reservoir to the upper portion via gravity.

A portion of each of the upper channel 240 and the lower channel 238 may be defined at least in part by the end plate 216 of the brake plate assembly 210. For example, the upper channel 240 may be positioned at and/or at least partially defined by upper end surface 300 of the end plate 216 that faces the upper shoulder 310 of the housing 202, where the upper end surface 300 is arranged away from the friction plates, and the lower channel 238 may be positioned at and/or at least partially defined by lower end surface 408 of the end plate 216 that faces the lower shoulder 404 of the housing 202, where the lower end surface 408 is arranged away from the friction plates.

The upper channel 240 and the lower channel 238 may each be arranged axially adjacent to the end plate 216, at an axial distance to the friction plates (e.g., spaced apart from the friction plates by the end plate 216). The lower channel 238 is arranged toward a drain end 260 of the housing 202 such that fluid (e.g., oil) may flow through the lower channel 238 from the reservoir 212 to the brake compartment 228 under the influence of gravity. Accordingly, with respect to an installation position and orientation of the wet brake system 200 within the vehicle, the lower channel 238 may be arranged in a vertically lower half of the housing 202 and may extend vertically downwards (e.g., in a direction of a gravity and/or in a direction of a ground surface on which the vehicle sits). The upper channel is arranged toward an upper end 258 of the housing 202, opposite to the drain end 260. In this arrangement, fluid (e.g., oil) may not flow into the upper channel 240 from the reservoir 212. For example, a level of oil within the reservoir 212 may be maintained vertically below the upper channel 240 such that the oil does not flow into the upper channel 240 via gravity.

During conditions in which the friction plates are not rotated, or are rotated at a speed below a threshold rotational speed, a volume of oil within the brake compartment 228 may be a larger, first volume, and during conditions in which the friction plates are rotated at higher speeds (e.g., above the threshold rotational speed), the volume of oil within the brake compartment 228 may be a smaller, second volume. For example, while the friction plates are not rotating or are rotating at speeds below the threshold speed, an oil level within the brake compartment 228 may be a higher, first oil level, where the oil level is indicated by axis 248. As the rotational speed of the friction plates increases, oil may be driven out of the brake compartment 228 through the upper channel 240 as a result of centrifugal pumping of the oil by the rotation of the friction plates. As a result, the oil level within the brake compartment 228 may decrease to a level lower than the higher, first oil level indicated by axis 248, such as the lower oil level indicated by axis 250. Meanwhile, the oil level within the reservoir 212 may increase from the level indicated by axis 248 to a level vertically higher than the axis 248, such as the level indicated by axis 252, due to the flow of oil to the reservoir 212 through the upper channel 240. The flow of oil from the brake compartment 228 to the reservoir 212 via the upper channel 240 as a result of the rotational speed of the friction plates reduces the volume of oil in contact with the plates of the brake plate assembly 210, which in turn may reduce energy losses and increase an efficiency of the vehicle (e.g., reduce an amount resistance to the motion of the vehicle resulting from the volume of oil in contact with the plates of the brake plate assembly 210 within the brake compartment 228). Because the volume of oil within the brake compartment 228 may decrease as the rotational speed of the drive shaft and the friction plates increases, the volume of oil within the brake compartment 228 may be described herein as an inversely proportional function of the rotational speed of the drive shaft and/or the friction plates.

The oil levels indicated by axis 248, axis 250, and axis 252 and described above are provided as non-limiting examples of oil levels within the portions of the housing 202. Although the threshold rotational speed is described above, in some examples the oil level within the brake compartment may be a function of the rotational speed of the friction plates and may increase as the rotational speed of the friction plates decreases and decrease as the rotational speed of the friction plates increases accordingly. In particular, the oil volume (e.g., oil level) within the brake compartment 228 may be based on the rotational speed of the friction plates and may increase or decrease in a gradual manner based on the rotational speed of the friction plates and independent of the threshold rotational speed described above.

Figure 8:
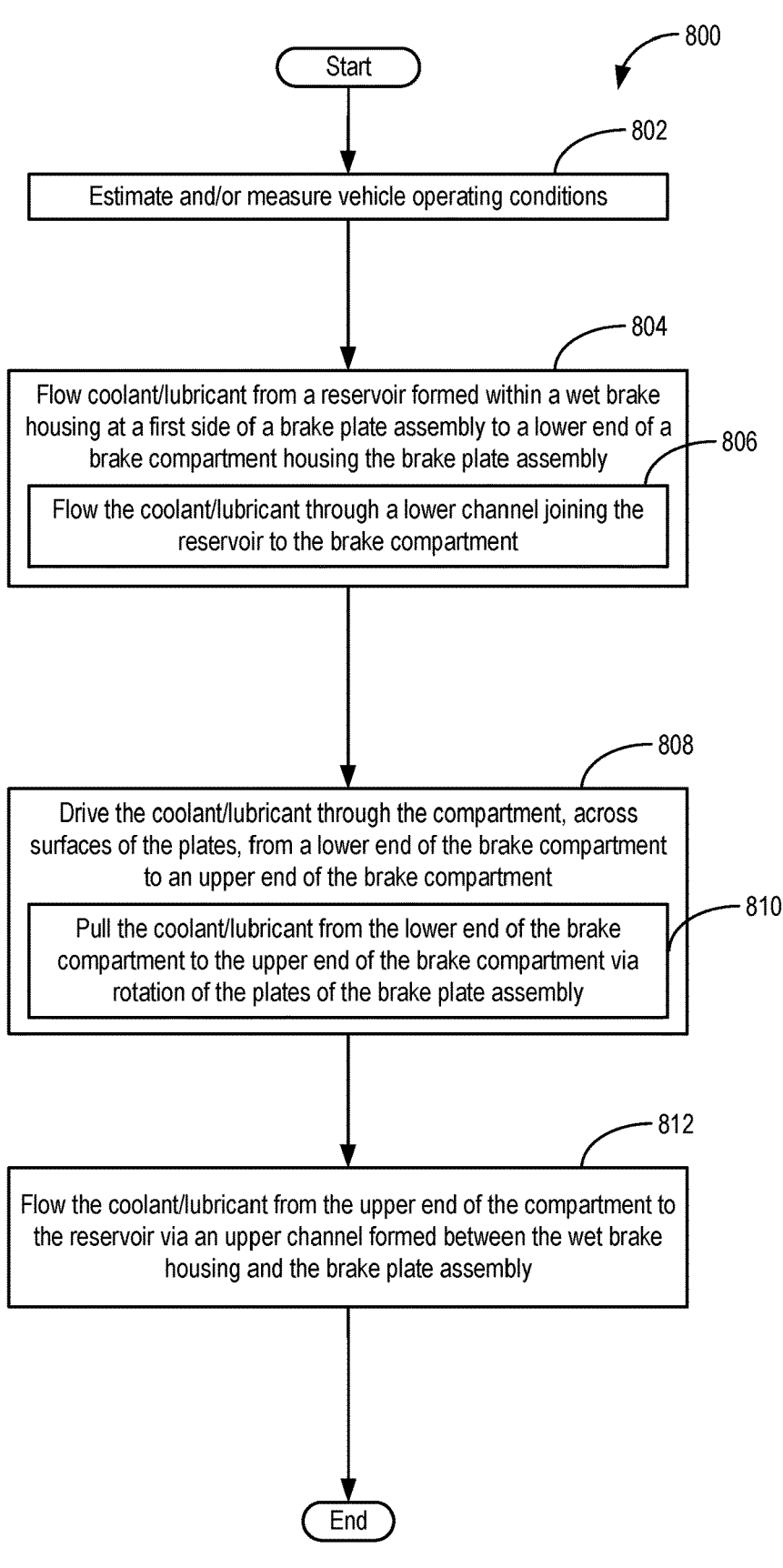
FIG. 8 shows a flow chart illustrating a method for flowing coolant through a housing of a wet brake system.

Referring to FIG. 8, a flow chart illustrating a method 800 for a wet brake system is shown. The wet brake system may be similar to, or the same as, the wet brake system 134 shown by FIG. 1 and described above and/or the wet brake system 200 shown by FIG. 2 and described above. Instructions for carrying out method 800 and the rest of the methods included herein may be executed by a controller based on instructions stored on a memory of the controller and in conjunction with signals received from sensors of the vehicle system, such as the sensors described above with reference to FIG. 1. The controller may employ actuators of the vehicle system to adjust vehicle operation, according to the methods described below.

At 802, the method includes estimating and/or measuring vehicle operating conditions. Estimating and/or measuring vehicle operating conditions may include, for example, estimating and/or measuring vehicle parameters such as vehicle speed (e.g., based on an output of one or more vehicle speed sensors), drive shaft rotational speed, wheel speed, wet brake coolant/lubricant temperature, brake engagement, coolant/lubricant flow rate, etc.

The method continues from 802 to 804 where the method includes flowing coolant from a reservoir formed within a wet brake housing at a first side of a brake plate assembly to a brake compartment housing the brake plate assembly. The reservoir, wet brake housing, brake plate assembly, and brake compartment may be similar to, or the same as, the reservoir 212, housing 202, brake plate assembly 210, and brake compartment 228, respectively, described herein. The reservoir may be arranged at the first side of the brake plate assembly and the brake compartment may be arranged at a second side of the brake plate assembly. The first side of the brake plate assembly may be a side facing a differential coupled to a drive shaft extending through the housing, and the second side may be a side across an end plate of the brake plate assembly and facing a wheel hub coupled to the drive shaft. The first side and the second side may be defined by opposing sides the end plate in an axial direction of the drive shaft, in some examples.

Flowing coolant/lubricant from the reservoir to the brake compartment at 804 includes, at 806, flowing the coolant/lubricant through a lower channel joining the reservoir to the brake compartment. The lower channel may be similar to, or the same as, the lower channel 238 described herein.

As one example, coolant/lubricant (e.g., oil) within the reservoir may flow from the reservoir, through the lower channel, and to the brake compartment via gravity. In particular, the lower channel may be arranged vertically lower than the reservoir such that the coolant/lubricant is urged by gravity to flow through the lower channel into the brake compartment.

The method continues from 804 to 808 where the method includes driving the coolant/lubricant through the compartment, across surfaces of the plates, from a lower end of the compartment to an upper end of the compartment.

Driving the coolant/lubricant through the compartment at 808 includes, at 810, pulling the coolant/lubricant from the lower end of the compartment to the upper end via rotation of plates of the brake plate assembly. For example, the brake plate assembly may include a plurality of friction plates fixedly coupled to the drive shaft, similar to the examples described herein. As the drive shaft rotates (e.g., due to torque applied to the drive shaft by an engine or motor of the vehicle), the friction plates rotate with the drive shaft. The rotation of the friction plates within the brake compartment results in centrifugal force applied to the coolant/lubricant within the brake reservoir by the friction plates. The coolant/lubricant is thus driven from the lower end of the brake compartment to the upper end of the brake compartment by centrifugal pumping of the coolant/lubricant resulting from the rotation of the friction plates.

The method continues from 808 to 812 where the method includes flowing the coolant/lubricant from the upper end of the brake compartment to the reservoir via an upper channel formed between the wet brake housing and the brake plate assembly. Flowing the coolant/lubricant from the upper end of the brake compartment to the reservoir may include driving the coolant/lubricant through the brake compartment and through the upper channel via the centrifugal pumping of the coolant/lubricant provided by the rotation of the friction plates.

A flow rate of the coolant/lubricant flowing from the brake compartment to the reservoir via the upper channel may be greater than a flow rate of the coolant/lubricant flowing from the reservoir to the brake compartment via the lower channel, in some examples. As one example, during conditions in which the drive shaft is not rotating, a volume of coolant/lubricant within the brake compartment may be a higher, first volume resulting from the flow of coolant/lubricant from the reservoir to the brake compartment via gravity, in combination with the lack of flow of coolant/lubricant from the brake compartment to the reservoir through the upper channel (e.g., due to lack of centrifugal pumping of the coolant/lubricant while the friction plates are not rotating). However, as the friction plates transition from a non-rotating condition to a rotating condition, coolant/lubricant may be driven (e.g., pumped) by the rotation of the friction plates through the brake compartment and through the upper channel to return to the reservoir. As the rotational speed of the drive shaft increases (e.g., as the vehicle speed increases), the rate at which the coolant/lubricant is driven through the upper channel may increase above the rate at which the coolant/lubricant flows from the reservoir to the brake compartment via the lower channel. As a result, the volume of coolant/lubricant within the brake compartment is decreased, while the volume of coolant/lubricant within the reservoir is increased, and energy losses resulting from contact of the volume of coolant/lubricant within the brake compartment with the friction plates may be reduced (e.g., less coolant/lubricant within the brake compartment may result in less energy losses as the friction plates rotate, due to decreased drag applied to the friction plates by the coolant/lubricant). Although the volume of coolant/lubricant within the brake compartment is reduced, a film of coolant/lubricant on surfaces of the friction plates may be maintained as the friction plates rotate to provide lubrication and cooling of the friction plates. As a result, vehicle efficiency may be increased.

Referring collectively to FIGS. 9-11, different sectional views of another wet brake system 900 are shown. In particular, FIG. 9 shows a side sectional view of the wet brake system 900, FIG. 10 shows a partial perspective sectional view of the wet brake system 900, and FIG. 10 shows an end sectional view of the wet brake system 900 (taken along axis 970 shown by FIG. 9).

The wet brake system 900 may include several components that are similar to, or the same as, the components described above with reference to the wet brake system 200 shown by FIGS. 2-7. Similar components may be labeled similarly, in some examples.

The wet brake system 900 includes a housing 902 encircling a drive shaft 904, and a plate assembly including an end plate 916, a plurality of friction plates (e.g., a first friction plate 930, a second friction plate 932, a third friction plate 934, and a fourth friction plate 936), and a plurality of separator plates (e.g., a first separator plate 920, a second separator plate 922, a third separator plate 924, and a fourth separator plate 926). The friction plates and separator plates encircle the drive shaft 904, and the friction plates may rotate around a rotational axis 946 of the drive shaft 904. The friction plates and separator plates are disposed within a brake compartment 928, with the brake compartment 928 separated from the reservoir 912 by the end plate 916. During conditions in which the drive shaft 904 is not rotated, oil may flow from the reservoir 912 through a lower channel 938 to the brake compartment 928 via gravity (e.g., in a direction of drain plug 964).

An inset 984 shows an enlarged view of a portion of the wet brake system 900. The friction plates are fixed to the drive shaft 904, and as the friction plates rotate due to a rotation of the drive shaft 904, the friction plates may drive oil through the brake compartment 928 to an upper channel 978, similar to the examples described above with reference to FIGS. 2-7. An example oil flow path 976 through the upper channel 978 is shown. The upper channel 978 is formed between an end surface 972 of the end plate 916 and an end surface 974 of the housing 902. Oil may flow out of an outlet 980 of the upper channel 978 formed between the housing 902 and a seat 982 of the end plate 916, and into the reservoir 912.

As shown by FIGS. 10-11, the end plate 916 of the wet brake system 900 further forms at least one side channel arranged vertically below the upper channel 978 (e.g., across the drive shaft 904 in the vertical direction, e.g., the direction of gravity). In the embodiment shown, the end plate 916 forms a first side channel 1000 and a second side channel 1002. The first side channel 1000 and the second side channel 1002 may each be formed between the end surface 972 of the end plate 916 and a corresponding end surface of the housing 902 (e.g., end surface 974). The end surface 972 of the end plate 916, as described herein, may be a relatively flat (e.g., planar) surface of the end plate 916, and each of the first side channel 1000, second side channel 1002, and upper channel 978 may be arranged along a same plane as the end surface 972 (e.g., although the first side channel 1000, second side channel 1002, and upper channel 978 are shown spaced apart from each other around the rotational axis 946, each of the channels may extend along a same plane at an angle to the rotational axis 946, e.g., a plane to which the rotational axis 946 is normal). As the friction plates rotate, oil driven through the brake compartment 928 via centrifugal pumping by the friction plates may flow out of the brake compartment 928 and to the reservoir 912 through the upper channel 978, the first side channel 1000, and/or the second side channel 1002. In the embodiment shown, the upper channel 978, the first side channel 1000, and the second side channel 1002 are spaced apart from each other evenly (e.g., by a same amount) in a direction around the rotational axis 946. However, in other embodiments, the spacing between the upper channel 978, the first side channel 1000, and the second side channel 1002 may be different (e.g., a spacing between the upper channel 978 and the first side channel 1000 may be larger than a spacing between the upper channel 978 and the second side channel 1002).

In some examples, the flow rate of oil through the first side channel 1000 and the second side channel 1002 may be based on a direction of rotation of the drive shaft 904 and the friction plates. As one example, during conditions in which the drive shaft 904 rotates in a first direction (e.g., clockwise), a flow rate of oil through the first side channel 1000 may be increased relative to a flow rate through the second side channel 1002, and during conditions in which the drive shaft 904 rotates in an opposite, second direction (e.g., counter-clockwise), the flow rate of oil through the second side channel 1002 may be increased relative to the flow rate of oil through the first side channel 1000. In another example, the flow rate of oil through the second side channel 1002 may be higher than the flow rate of oil through the first side channel 1000 during conditions in which the drive shaft 904 is rotated in the first direction, and the flow rate of oil through the first side channel 1000 may be higher than the flow rate of oil through the second side channel 1002 during conditions in which the drive shaft 904 is rotated in the second direction.

By including the first side channel 1000 and the second side channel 1002, the flow rate of oil from the brake compartment 928 to the reservoir 912 may be increased, which may further reduce energy losses while the drive shaft 904 is rotated. As a result, vehicle efficiency may be increased.

References herein to axial, radial and circumferential directions or arrangements may refer to the rotational axis of the drive shaft and friction plates, or to axes extending in parallel thereto. A radial direction may extend at an angle and in particular orthogonally to the rotational axis. A circumferential direction may extend about the rotational axis (e.g., around the rotational axis). Further, the terms fluid and liquid may be used interchangeably herein.

FIGS. 2-7 and 9-11 are shown to scale, although other relative dimensions may be used, if desired.

FIGS. 2-7 and 9-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features.

Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A wet brake system for a vehicle, comprising:
a drive shaft;
a housing including a brake compartment and a reservoir axially offset from the brake compartment along the drive shaft;
a brake plate assembly including an end plate arranged within the brake compartment;
a lower channel formed between the end plate and the housing and arranged at a drain end of the housing, wherein oil flows from the reservoir to the lower channel and into the brake compartment; and
an upper channel formed between the end plate and the housing, opposite to the lower channel across the drive shaft, wherein oil flows from the brake compartment to the reservoir via the upper channel, and wherein a flow rate of the oil in the upper channel is greater than a flow rate of oil in the lower channel during rotation of friction plates in the brake plate assembly.

2. The wet brake system of claim 1, wherein the upper channel and the lower channel are each defined at least in part by respective end surfaces of the end plate and a respective shoulder surfaces of the housing.

3. The wet brake system of claim 1, wherein the upper channel and the lower channel are the only fluidic connections between the reservoir and the brake compartment.

4. The wet brake system of claim 1, wherein the upper channel and the lower channel are arranged along a plane orthogonal to a rotational axis of the drive shaft.

5. The wet brake system of claim 1, wherein the upper channel and the lower channel are formed together as a single, annular channel extending around the drive shaft along an inner perimeter of the housing.

6. The wet brake system of claim 1, wherein a radial length between the lower channel and the drive shaft is greater than a radial length between the drive shaft and a wall of the reservoir.

7. The wet brake system of claim 1, wherein the brake compartment encircles an entire perimeter of the end plate, and wherein the end plate comprises a shape different than a plurality of friction plates and a plurality of separator plates of the brake plate assembly.

8. The wet brake system of claim 1, wherein the brake plate assembly further includes a plurality of friction plates rotatably driven by the drive shaft, where rotation of the plurality of friction plates drives oil from the brake compartment through the upper channel, the brake plate assembly further including a plurality of separator plates, wherein the plurality of separator plates alternate with the plurality of friction plates.

9. The wet brake system of claim 1, wherein the reservoir feeds oil to the lower channel via gravity.

10. The wet brake system of claim 1, further comprising at least one side channel formed between the end plate and the housing, where the at least one side channel fluidly couples the brake compartment and the reservoir.

11. A system, comprising:
a housing partitioned by an end plate of a brake plate assembly, including a brake compartment at a first side of the end plate and a reservoir at an opposing, second side of the end plate;
a plurality of friction plates of the brake plate assembly disposed within the brake compartment;
an oil intake channel arranged to receive oil from the reservoir via gravity, wherein oil flows from the reservoir to the lower channel and into the brake compartment; and
an oil output channel opposite to the oil intake channel across a drive shaft, arranged to return the oil to the reservoir via centrifugal pumping of the oil through the brake compartment by the plurality of friction plates, wherein oil flows from the brake compartment to the reservoir via the upper channel, and wherein a flow rate of the oil in the upper channel is greater than a flow rate of oil in the lower channel during rotation of friction plates in the brake plate assembly.

12. The system of claim 11, wherein the oil intake channel and the oil output channel are each defined at least in part by an end surface at the second side of the end plate and a respective shoulder of the housing, where the respective shoulder is adjacent to the end surface and spaced apart from the end surface, and wherein an inlet of the oil output channel and the outlet of the oil input channel are equidistant from a drive shaft.

13. The system of claim 12, wherein a width of the oil output channel between the end surface and the respective shoulder is less than a length of the oil output channel in a direction orthogonal to a rotational axis of the plurality of friction plates.

14. The system of claim 11, wherein a rate of the centrifugal pumping is based on a rotational speed of the drive shaft.

15. The system of claim 11, wherein a volume of oil within the brake compartment is based on a rotational speed of the drive shaft.

16. The system of claim 11, wherein a volume of oil within the brake compartment is an inversely proportional function of a rotational speed of the drive shaft.

17. A method, comprising:
flowing a coolant/lubricant from a reservoir formed within a wet brake housing at a first side of a brake plate assembly through a lower channel to a lower end of a brake compartment arranged between the brake plate assembly and the wet brake housing, wherein oil flows from the reservoir to the lower channel and into the brake compartment; and
returning the coolant/lubricant from an upper end of the brake compartment to the reservoir via an upper channel formed between an end plate of the brake plate assembly and the wet brake housing, wherein oil flows from the brake compartment to the reservoir via the upper channel, and wherein a flow rate of the oil in the upper channel is greater than a flow rate of oil in the lower channel during rotation of friction plates in the brake plate assembly.

18. The method of claim 17, further comprising: driving the coolant/lubricant through the brake compartment, across surfaces of a plurality of friction plates of the brake plate assembly, from the lower end of the brake compartment to the upper end of the brake compartment.

19. The method of claim 18, wherein driving the driving the coolant/lubricant through the brake compartment from the lower end to the upper end includes pulling the coolant/lubricant from the lower end of the brake compartment to the upper end of the brake compartment via rotation of the plurality of friction plates of the brake plate assembly.

20. The method of claim 19, wherein a rate of the returning of the coolant/lubricant from the upper end of the brake compartment to the reservoir via the upper channel is based on a rotational speed of the plurality of friction plates.

\*　\*　\*　\*　\*